UNITED STATES PATENT OFFICE 2,516,531

PROTEIN EXTRACTION

William J. Shibe, Jr., Andalusia, Pa.

No Drawing. Application November 25, 1947,
Serial No. 788,095

13 Claims. (Cl. 260—112)

This invention relates to a new hydrophilic agent in the form of a quaternary ammonium salt and more particularly to a method of extracting or preparing proteins in a substantially pure, unhydrolyzed condition by means of such quaternary ammonium salt.

My present invention is based upon my discovery that plant proteins, such as the proteins of soya bean meal and peanut meal, can be effectively extracted and isolated from other components of plant materials by a relatively simple procedure involving the use of a simple quaternary ammonium salt. I have further discovered that the same principles can be applied to animal proteins, such as those occurring in horn, feathers, hoofs and the like.

The quaternary ammonium salts forming a part of, and used in connection with, the present invention are simple quaternary ammonium salts of a non-detergent type. Such quaternary ammonium salts are, for example, halides, sulfates and other acid compounds of tetra-alkyl ammonium, tri-alkyl benzyl ammonium or di-alkyl di-benzyl ammonium cationic radicals. As alkyl substituents I include methyl, ethyl, propyl and butyl hydrocarbon radicals. These quaternary ammonium salts are to be particularly distinguished from the detergent types wherein the alkyl group is lauryl, cetyl or stearyl and, more generally, from those quaternary ammonium compounds having a higher alkyl group of eight or more carbon atoms. The quaternary ammonium compounds and salts forming a part of this invention are hereafter referred to as lower alkyl quaternary ammonium salt.

I have discovered that by refluxing a protein-containing substance of vegetable or animal origin in a 25-50% aqueous solution (a concentrated solution) of one of the lower alkyl quaternary ammonium salts above referred to, the protein goes into solution therein and can, moreover, be readily regenerated upon dilution, the regenerated protein precipitating as a flocculent mass and being thereafter washed and dried. This dissolving and re-precipitating action does not effect hydrolysis of such proteins and, therefore, there are no serious losses due to hydrolysis or other form of breakdown or degradation. The mono- and di-saccharide components of these proteins, when present, are also dissolved but they hydrolyze and hence remain in solution when the proteins are regenerated as above described. Cellulose, when present, is not affected in any way by the treatment or the solution and hence remains insoluble and can, therefore, be readily removed or separated as by filtration, decantation, etc., prior to the regeneration of the dissolved proteins. Starch, when present, is likewise dissolved in the solution under the conditions of operation recited but, upon dilution, becomes colloidal and does not interfere with the regeneration and separation of the proteins. The procedure referred to is preferably carried out upon lignin-free materials, because lignin, when present, becomes dissolved and precipitates with the protein and, therefore, my present invention does not provide a separation of protein from lignin-containing substances but it does offer a means for preparing pure cellulose free from lignin and protein.

The invention will be further understood from the following examples which are not intended as a limitation upon the invention.

Example I 10 grams of oil-free soya bean meal and 50 grams of a 50% aqueous solution of tri-methyl benzyl ammonium chloride were refluxed for one hour. While still hot, the solution was filtered through gauze to remove cellulose and other insoluble materials. The filtrate was diluted to 500 cc. and allowed to stand from one to two hours, during which time the protein settled to the bottom of the container and was removed or isolated by filtration. The yield of protein was approximately 4.5 to 5 grams when dried at 100° C. The filtrate which remained after the regenerated protein was removed was concentrated to 50 cc. and re-used.

Example II 15 grams of feathers were refluxed for 16 hours in a concentrated solution containing 200 grams of tri-methyl benzyl ammonium chloride. The remainder of the procedure was carried out in accordance with Example I.

The longer time required to dissolve animal proteins can be reduced to the time required for dissolving vegetable proteins by heating the animal protein and quaternary ammonium solution to a temperature of about 130–150° C. under pressure in an autoclave or other suitable equipment.

I claim:

1. A method of extracting proteins from protein-containing material which comprises dissolving the proteins in a concentrated aqueous solution of a lower alkyl quaternary ammonium salt, separating the solution thus formed from the insoluble matter, regenerating the proteins by diluting the solution thereof and separating the regenerated proteins thus formed.

2. A method of extracting proteins from protein-containing material which comprises dissolving the proteins in a concentrated aqueous solution of a lower alkyl quaternary ammonium salt under refluxing, separating the solution thus formed from insoluble matter, regenerating the proteins by diluting the solution thereof with water and isolating the regenerated proteins thus formed.

3. A method of extracting proteins from a protein-containing material which comprises dissolving the proteins in a concentrated aqueous solution of a low alkyl quaternary ammonium salt by heating the same under pressure, separating the solution thus formed from insoluble matter by filtration, regenerating the proteins by diluting the filtrate thus produced and removing the regenerated proteins thus formed.

4. A method of preparing substantially pure unhydrolyzed proteins which comprises the steps of dissolving such proteins out of a lignin-free protein-containing material by subjecting the same to the action of a concentrated aqueous solution of a lower alkyl quaternary ammonium salt, filtering the product so produced to separate insolubles, diluting the filtrate about tenfold with water and separating, by filtration, the regenerated proteins so produced.

5. A method of preparing substantially pure unhydrolyzed vegetable and animal proteins which comprises the steps of dissolving such proteins out of a lignin-free protein-containing material by subjecting the same to the action of a 25-50% aqueous solution of a lower alkyl quaternary ammonium salt, filtering the product so produced to separate insolubles, diluting the filtrate about tenfold with water and separating, by filtration, the regenerated proteins so produced.

6. A method of preparing substantially pure unhydrolyzed vegetable and animal proteins which comprises the steps of dissolving such proteins out of a lignin-free protein-containing material by subjecting the same to the action of a heated 25-50% aqueous solution of a lower alkyl quaternary ammonium salt, filtering the product so produced to separate insolubles, diluting the filtrate about tenfold with water and separating, by filtration, the regenerated proteins so produced, said regenerated proteins being thereafter washed with water to remove substantially all residual non-protein material therefrom and dried.

7. A method of preparing substantially pure unhydrolyzed protein from a protein-containing lignin-free material of vegetable origin which comprises refluxing the said protein-containing material with a concentrated aqueous solution of tri-methyl benzyl ammonium chloride until the protein content thereof is dissolved, filtering the solution while still hot, diluting the filtrate to regenerate the dissolved protein and separting the regenerated protein thus obtained.

8. A method of preparing proteins in accordance with claim 4 in which the lower alkyl quaternary ammonium salt is a halide.

9. A method of preparing proteins in accordance with claim 5 in which the lower alkyl quaternary ammonium salt is a sulfate.

10. A method of preparing proteins in accordance with claim 4 in which the lower alkyl group of the quaternary ammonium salt is methyl.

11. A method of preparing proteins in accordance with claim 4 in which the lower alkyl group of the quaternary ammonium salt is ethyl.

12. A method of preparing proteins in accordance with claim 4 in which the lower alkyl group of the quaternary ammonium salt is propyl.

13. A method of preparing proteins in accordance with claim 4 in which the lower alkyl group of the quaternary ammonium salt is butyl.

WILLIAM J. SHIBE, Jr.

REFERENCES CITED

The following references are of record in the file of this patent:

UNITED STATES PATENTS

| Number | Name | Date |
| --- | --- | --- |
| 2,145,855 | Bley | Feb. 7, 1939 |
| 2,243,871 | Lawrence et al. | June 3, 1941 |
| 2,409,475 | Cline | Oct. 15, 1946 |